(12) United States Patent
Linden Henry

(10) Patent No.: US 6,361,322 B1
(45) Date of Patent: Mar. 26, 2002

(54) SYSTEM AND METHOD FOR IMPROVING A USER'S PERFORMANCE ON READING TESTS

(75) Inventor: Nancy E. Linden Henry, Dallas, TX (US)

(73) Assignee: Book & Brain Consulting, Inc., Dallas, TX (US)

( * ) Notice: Subject to any disclaimer, the term of this patent is extended or adjusted under 35 U.S.C. 154(b) by 0 days.

(21) Appl. No.: 09/519,126

(22) Filed: Mar. 6, 2000

(51) Int. Cl.[7] .............................................. G09B 17/00
(52) U.S. Cl. ...................... 434/178; 434/156; 434/322
(58) Field of Search ................ 434/178, 156, 434/169, 322, 350, 353

(56) References Cited

U.S. PATENT DOCUMENTS

| | | | | |
|---|---|---|---|---|
| 4,650,426 A | * | 3/1987 | Brigance ................. | 434/322 X |
| 4,895,518 A | * | 1/1990 | Arnold et al. ........... | 434/118 X |
| 5,141,439 A | * | 8/1992 | Cousins .................. | 434/178 X |
| 5,147,205 A | * | 9/1992 | Gross et al. ............ | 434/169 X |
| 5,256,067 A | * | 10/1993 | Gildea et al. ........... | 434/169 X |
| 5,407,357 A | * | 4/1995 | Cutler .................... | 434/335 X |
| 5,657,256 A | * | 8/1997 | Swanson et al. ........ | 702/119 X |
| 5,658,161 A | * | 8/1997 | Roberts et al. ......... | 434/353 X |
| 6,144,838 A | * | 11/2000 | Sheehan ................. | 434/362 X |
| 6,305,942 B1 | * | 10/2001 | Block et al. ............. | 434/156 |

* cited by examiner

*Primary Examiner*—John Edmund Rovnak
*Assistant Examiner*—Chanda Harris
(74) *Attorney, Agent, or Firm*—Baker Botts L.L.P.

(57) ABSTRACT

A method of teaching reading comprehension includes presenting a reading passage to a user, asking the user a question relating to the reading passage, and receiving an answer from the user. The method indicates to the user that the answer is an incorrect type of answer to the question if the question tests the user's ability to identify information from the passage and the answer uses information that is not from the passage. Also, the method indicates to the user that the answer is an incorrect type of answer to the question if the question tests the user's ability to infer a conclusion from the passage and the answer uses specific information from the passage. A computer system for improving a user's performance on reading tests includes a memory, a test module and a review module. Software embodied in a computer-readable medium and written material provide other implementations to improve a user's performance on reading tests.

21 Claims, 2 Drawing Sheets

SYSTEM AND METHOD FOR IMPROVING A USER'S PERFORMANCE ON READING TESTS

TECHNICAL FIELD OF THE INVENTION

This invention relates generally to the field of learning aids and, more particularly, to a system and method for improving a user's performance on reading tests.

BACKGROUND OF THE INVENTION

Many students do not perform well on reading tests. Some students lack knowledge, some students have poor reading comprehension skills, and some students suffer from testing anxiety. Even students, who possess sufficient knowledge, have adequate reading comprehension skills, and feel comfortable taking tests, still perform poorly on reading tests. Students often feel overwhelmed by the amount of reading, the diversity of questions, and the tasks that they face in taking reading tests.

SUMMARY OF THE INVENTION

In accordance with the present invention, a system and method for improving a user's performance on reading tests is provided that substantially eliminates or reduces disadvantages or problems associated with previously developed systems and methods.

In one embodiment, a computer system for improving a user's performance on reading tests includes a memory, a test module, and a review module. The memory includes a reading passage, a first question, a second question, and an answer key. The first question tests a user's ability to identify information from the passage. The first question includes a first answer choice comprising the information from the passage that is responsive to the first question, a second answer choice comprising other information from the passage that is not responsive to the first question, and a third answer choice comprising other information that is not from the passage. The second question tests the user's ability to infer a conclusion from the passage. The second question includes a fourth answer choice comprising the conclusion that is supported by the passage, a fifth answer choice comprising another conclusion that is not supported by the passage, and a sixth answer choice comprising information from the passage. The answer key indicates that the first question is a book question and that the second question is a brain question. The answer key further indicates that the first, second, and sixth answer choices are book answers and that the third, fourth, and fifth answer choices are brain answers. The test module presents the reading passage and the first and second questions to the user and receives a first answer to the first question and a second answer to the second question from the user. The review module indicates to the user that the first question is a book question and indicates to the user that the first answer is correct if it corresponds to the first answer choice. The review module indicates to the user that the first answer is a book answer if the first answer corresponds to the first or second answer choice and indicates to the user that the first answer is a brain answer if the first answer corresponds to the third answer choice. The review module indicates to the user that the second question is a brain question and indicates to the user that the second answer is correct if it corresponds to the fourth answer choice. The review module indicates to the user that the second answer is a brain answer if the second answer corresponds to the fourth or fifth answer choices and indicates to the user that the second answer is a book answer if the second answer corresponds to the sixth answer choice.

In another embodiment, a method of teaching reading comprehension includes the steps of presenting a reading passage to a user, asking the user a question relating to the reading passage, and receiving an answer from the user. The method further includes the step of indicating to the user that the answer is an incorrect type of answer to the question if the question tests the user's ability to identify information from the passage and the answer comprises information that is not from the passage or if the question tests the user's ability to infer a conclusion from the passage and the answer comprises specific information from the passage.

Technical advantages of the present invention include a system and method for improving a user's performance on reading tests. The system and method present a user with a passage and multiple questions relating to the passage. The system and method classify the questions according to whether they test the user's ability to identify information from the passage or the user's ability to infer a conclusion from the passage. The answers to the first type of questions, called book questions, are typically found explicitly in the passage. In contrast, the second type of questions, called brain questions, require the user to employ higher-level thinking skills to identify an answer not explicitly found in the passage. In response to receiving answers to the questions, the system and method indicate the types of questions presented to the user and the types of answers received from the user. As a result, the system and method teach the user to identify the two types of questions in reading tests and to answer the questions according to their type. The following description, figures, and claims further describe the present invention, including its features, functions, and technical advantages.

DETAILED DESCRIPTION OF THE DRAWINGS

Figure 1:
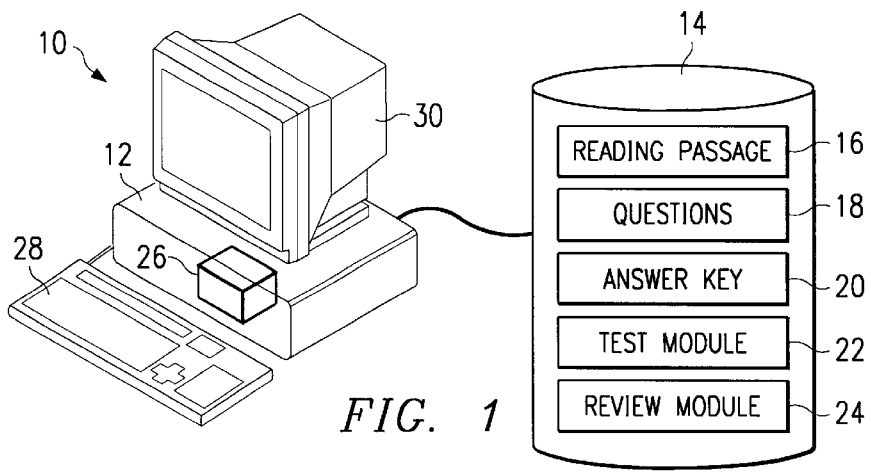
FIG. 1 illustrates a computer system for improving a user's performance on reading tests.

FIG. 1 illustrates a computer system 10 for improving a user's performance on reading tests. Computer system 10 includes a computer 12 and a memory 14. Using a test module 22, computer 12 presents a reading passage 16 and questions 18 to a user and receives answers to questions 18 from the user. Using a review module 24, computer 12 indicates to the user whether the user's answers to questions 18 are correct. In addition, computer 12 indicates the types of questions 18 presented to the user and the types of answers received from the user. As a result, system 10 teaches the user to identify different types of questions 18 and to answer questions 18 according to their types.

Computer 12 executes test module 22 and review module 24. Computer 12 may be a personal computer (PC), a network computer, a personal digital assistant (PDA), or any other communication or processing device that executes programmed instructions. Computer 12 includes at least one processor 26, at least one input device 28, and at least one output device 30. Computer 12 receives information from a user using input device 28 and communicates information to the user using output device 30. Input device 28 may include a keyboard, mouse, touch screen, or any other device that communicates information from a user to computer 12. Output device 30 may include a monitor, a projector, a printer, or any other suitable device that communicates information from computer 12 to a user.

Memory 14 stores reading passage 16, questions 18, answer key 20, test module 22, and review module 24. In a particular embodiment, reading passage 16, questions 18, and answer key 20 are stored in one or more data files, and testing module 22 and review module 24 are stored in one or more executable files. Memory 14 may include volatile memory, non-volatile memory, or a combination of both volatile and non-volatile memory. Although memory 14 is illustrated as external from computer 12 in FIG. 1, memory 14 may include any suitable combination of one or more storage locations either internal to computer 12 or external from computer 12 according to particular needs. In a particular embodiment, memory 14 is a CD-ROM, DVD, or any other suitable computer readable medium.

Reading passage 16 includes one or more paragraphs of text. Reading passage 16 may include persuasive, descriptive, expositive, or any other type of writing. Reading passage 16 may vary in length and difficulty according to the user's reading level. In a particular embodiment, memory 14 stores several reading passages 16, each associated with a separate set of questions 18.

Questions 18 are multiple-choice questions relating to reading passage 16. Each question 18 includes several answer choices, one of which is the correct answer. If question 18 tests a user's ability to identify information from passage 16, a correct answer choice includes the information from passage 16 that is responsive to question 18. Incorrect answer choices may include information from passage 16 that is not responsive to question 18 or information that is not from passage 16. If question 18 tests the user's ability to infer a conclusion from passage 16, a correct answer choice includes a conclusion that is supported by passage 16 and responsive to question 18. Incorrect answer choices may include a conclusion that is not supported by passage 16, a conclusion that is not responsive to question 18, or specific information from passage 16 that does not qualify as a general inference.

Answer key 20 includes information about questions 18 and their answer choices. Answer key 20 indicates, for each question 18, an answer choice that is the correct answer to question 18. Answer key 20 also classifies each question 18 according to whether question 18 tests the user's ability to identify information from passage 16 or whether question 18 tests the user's ability to infer a conclusion from passage 16. The first type of questions 18, called book questions, typically directs the user to reading passage 16, in which the correct answer is explicitly stated. The second type of questions 18, called brain questions, moves the user beyond merely locating information in passage 16 to employing higher-level thinking skills, such as analysis, synthesis, and evaluation. The user will not be able to find the correct answers to brain questions 18 directly stated in passage 16. Rather, the user must infer the correct answers from evidence in passage 16.

Similarly, answer key 20 classifies each answer choice to questions 18 according to whether the answer choice is information from passage 16 or a conclusion that is not explicitly found in passage 16 but may be inferred from passage 16. The first type of answer choices, called book answers, may be correct answers to book questions 18. The second type of answer choices, called brain answers, may be correct answers to brain questions 18.

Test module 22 presents reading passage 16 and questions 18 to a user and receives answers to questions 18 from the user. The answer to each question 18 corresponds to one of the multiple answer choices of question 18. Test module 22 stores the received answers so that review module 24 may provide the user feedback based on the user's performance.

Review module 24 receives the stored answers from testing module 22 and provides the user with information related to questions 18 and the user's answers to questions 18. For each question 18, review module 24 indicates whether question 18 is a book question or a brain question according to answer key 20. Review module 24 also indicates whether the user's answer to each question 18 is correct or incorrect. In addition, review module 24 indicates whether the user's answer is a book answer or a brain answer according to answer key 20. If the user's answer corresponds to an answer choice that is a book answer according to answer key 20, review module 24 indicates that the user's answer is a book answer. If the user's answer corresponds to an answer choice that is a brain answer according to answer key 20, review module 24 indicates that the user's answer is a brain answer. As a result, review module 24 indicates whether each question 18 is a book question or a brain question and whether the user's corresponding answer is a book answer or a brain answer. By providing the user with this information, review module 24 teaches the user to identify questions 18 as book or brain questions and to identify the answer choices to questions 18 as book or brain answers. As a result, the user learns to answer questions 18 with the proper, corresponding type of answers.

In a particular embodiment, review module 24 indicates to the user whether each answer choice to question 18 is a book or brain answer according to answer key 22. Thus, even if the user does not select a particular answer choice, the user may learn whether the answer choice is a book or brain answer.

System 10 teaches students to answer reading comprehension questions according to whether the question is a book question or a brain question. The user learns to identify questions as book or brain questions and answers as book or brain answers. The user also learns to answer book questions with book answers and brain questions with brain answers. Although a particular software implementation is described with reference to FIG. 1, system 10 contemplates any suitable combination of hardware, software, or both hardware and software that classifies questions 18 according to whether questions 18 test a user's ability to identify information from passage 16 or test the user's ability to infer a conclusion from passage 16.

In addition, a printed test, a student exercise booklet, a teacher manual, or any other suitable written material may include passage 16, questions 18, and answer key 20. Such written material may be used to teach a student to identify questions as book or brain questions and answers as book or brain answers. The written material improves the student's performance on reading tests by teaching the student to answer book questions with book answers and brain questions with brain answers.

In a particular embodiment, at least one of questions 18 tests a user's ability to identify a cause or effect from passage 16. Cause-and-effect questions 18 are typically book questions because they generally require a user to locate a cause-and-effect relationship in passage 16. For example, consider the following exemplary passage 16 and question 18:

When a scuba diver dives over 100 feet, there is a chance of getting nitrogen narcosis, a phenomenon that occurs when there is too much nitrogen in the human bloodstream. The result of this problem makes the diver feel intoxicated or drunk, and the diver begins to display poor judgment while underwater. This is a very dangerous position to be in when diving. When diving in deep water, it is always wise to dive with a buddy, and to check the depth level on the high pressure gauge of the airtank.

Which of the following is the cause of nitrogen narcosis?

A. Divers dive in deep water over 100 feet.

B. A diver will feel intoxicated or drunk and display poor judgment underwater.

C. Sometimes, divers will dive without a buddy.

D. Divers with nitrogen narcosis will take the breathing tube out of their mouths.

In this example, question 18 is a book question, answer choices A and B are book answers, answer choices C and D are brain answers, and answer choice A is the correct answer. Question 18 is a book question because it tests a user's ability to identify information (the cause of nitrogen narcosis) from passage 16. Answer choice A is a book answer because it states the true cause of nitrogen narcosis as stated directly in passage 16. Answer choice B is a book answer because it is a specific effect of nitrogen narcosis that is stated in passage 16. Answer choice C is a brain answer because it is an implied cause of nitrogen narcosis that is not specifically stated in passage 16. Answer choice D is a brain answer because it is an implied effect that is not specifically stated in passage 16. Answer choice A is the correct answer to question 18 because it is a book answer that is responsive to question 18.

In a particular embodiment, at least one of questions 18 tests a user's ability to identify a similarity or difference from passage 16. Compare-and-contrast questions 18 typically are book questions because they generally do not ask a user to generate a similarity or difference but rather to rely on information in passage 16. If question 18 tests the user's ability to identify a similarity, a correct answer choice is a book answer that identifies the similarity from passage 16 that is responsive to question 18. Incorrect answer choices may include a book answer that identifies a difference from passage 16 or a brain answer that identifies a similarity not found in passage 16. If question 18 tests the user's ability to identify a difference, a correct answer choice is a book answer that identifies the difference from passage 16 that is responsive to question 18. Incorrect answer choices may include a book answer that identifies a similarity from passage 16 or a brain answer that identifies a difference not found in passage 16.

Consider the following exemplary passage 16 and question 18:

A Dalmatian dog is very different from most dogs. It is a highly intelligent and helpful creature. Before the movie 101 Dalmatians, the Dalmatian was famous for being the firehouse dog. In the late 1800s, firetrucks were pulled by horse and wagon. Dalmatians would run beside and in front of the horses. Because of their beautiful black and white spotted coloring, Dalmatian dogs were easy to see. When people saw the Dalmatians, they would clear the streets for the firewagons. In this way people did not get run over by the fast-moving wagons. Firehouses usually had over 14 dogs to help with the firewagons.

Dalmatians have much endurance, which means that the Dalmatians can run for a very long time. Unlike Dalmatians, other dogs get tired and need to rest. Dalmatians have as much energy as a horse. They can run beside a horse for hours, keeping with the same pace, trot or gallop.

Like most dogs, Dalmatians love people. They hate to be alone, and they like a lot of human attention. When firemen were on duty, these dogs would get all the love and attention they needed.

According to the passage, what makes Dalmatians different?

A. They do not like to be alone, and they need love and attention.

B. They have more endurance.

C. They have white fur with black patches.

D. They are as intelligent as other dogs.

In this example, question 18 is a book question, answer choices A and B are book answers, answer choices C and D are brain answers, and answer choice B is the correct answer. Question 18 is a book question because question 18 tests the user's ability to identify a difference from a contrast in passage 16. Answer choices A and B are book answers because they include specific information found in passage 16. Answer choice A, however, is incorrect because it states a similarity, instead of a difference. Answer choices C and D are brain answers because they are not directly stated in passage 16. Answer choices C and D may or may not be implied by common sense or based on common knowledge.

In a particular embodiment, at least one of questions 18 tests a user's ability to determine the meaning of unfamiliar words or technical terms using context clues from passages 16. Consider the following exemplary passage 16 and question 18:

There once was an old queen who was stuck with an old king. They did not get along, and all the people of the kingdom knew it. The king and queen argued for days and days. Finally, a decision was made. The king and queen argued on one thing; they would pick one person from the royal court to help them solve their disputes. "This person should be very wise and strong in character," said the king. "But who will it be?" asked the queen. So, the hunt began for a wise, strong and faithful member of the king's court.

In this story, the word court means:

A. The residents of a sovereign dignitary.

B. To attract, tempt or woo.

C. A meeting of a judicial body.

D. A space marked off for playing the game.

In this example, question 18 is a book question, answer choice A is a book answer, answer choices B, C, and D are brain answers, and answer choice A is the correct answer to question 18. Because the first step in answering question 18 is locating a word, phrase, or clause in passage 16, answer key 20 identifies question 18 as a book question. Answer choice A is a book answer because it is the meaning of the word "court" as used in passage 16. Answer choices B, C and D are brain answers because they provide a possible definition of "court" that a user may know from prior knowledge but that does not apply to the word as used in passage 16.

In a particular embodiment, at least one of questions 18 tests the user's ability to distinguish between fact and opinion. Such fact-and-opinion questions 18 are book questions because they test the user's ability to find and recognize facts or opinions presented in passage 16. Consider the following exemplary passage 16 and question 18:

There are many coral reef fish that have an odd way of life. Angel fish seem to be the most curious fish in the reef. They often have gaudy colors and eat seafans and sponges. Later, when the angel fish grow, their diet consists of parasites they remove from other fish. Tough skinned trigger fish have powerful jaws and sharp teeth. With their eyes spaced back away from their mouths, trigger fish eat sea urchins. The grouper fish will flash new, beautiful colors and patterns during the transition from a juvenile to a adult. Also, these fish mature in a unique way. All groupers mature first as females and produce eggs, but later in life these fish become males. Believe it or not!

Which of the following is a fact presented in the selection?

A. Angel fish seem to be the most curious fish in the reef.
B. All groupers start out as females, and then they become males.
C. The coloring of reef fish protects them by helping them blend in with their environment.
D. Trigger fish are odd looking fish, having their eyes set away from their mouths, so that they can eat sea urchins.

In this example, question 18 is a book question, answer choices A and B are book answers, answer choices C and D are brain answers, and answer choice B is the correct answer. Answer choices A and B are book answers because they provide information that is stated in passage 16. Answer choice A, however, is incorrect because it is an opinion as opposed to a fact. Answer choices C and D are brain answers because they are not directly stated in passage 16. Even though answer choice C is a general fact that the user may know from common knowledge, the fact is not presented in passage 16 and, thus, is an incorrect answer to question 18.

In a particular embodiment, at least one of questions 18 tests a user's ability to recognize a sequential order of events in passage 16. Question 18 is a book question because the user must identify events from passage 16. Consider the following exemplary passage 16 and question 18:

An Army identification tag from a soldier who served 35 years was found inside a shark's belly. The deep sea fishermen could not believe it. First, they reeled in a 120 pound shark, and then they found the tag in its belly! This was more than a fish story; this was a news story. After the fish was lured in with a large flounder, the men had no idea that the bite on the other side was a shark. When they saw the dorsal fin in the water and finally identified it as a shark, they decided to take a chance and reel it in anyway. There were 11 men on board, and this would be a challenge of a lifetime. After a short fight, the shark seemed utterly exhausted. When it was finally on board the boat, the men saw it had many large scars from fighting with other fish. The shark quickly died, and the men brought the giant to shore with them. They were ready for a great shark meal. But, when they found the soldier's tag, this shocked them, and they were thankful they were not the shark's last meal.

Which event happened first in the story?

A. The men set out to go deep sea fishing, ready for anything.
B. The fishermen found the tag in the belly of the shark.
C. The men had caught many fish in their lifetimes, but never a shark of this size.
D. The fishermen used large flounder as bait to lure in large fish.

In this example, question 18 is a book question, answer choices A and C are brain answers, answer choices B and D are book answers, and answer choice D is correct. Question 18 is a book question because its answer can be explicitly found in passage 16. Answer choices A and C are brain answers because they are implied by passage 16 but not specifically stated in passage 16. Although answer choice A may seem a logical first event, it is never specifically stated in passage 16. In contrast, answer choices B and D are specific events that are stated in passage 16. Answer choice B, however, is incorrect because it is not the first event in the specific sequential order.

In a particular embodiment, at least one of questions 18 tests a user's ability to draw a generalization from passage 16. Question 18 is a brain question because the user must infer the generalization from passage 16. Consider the following exemplary passage 16 and question 18:

"I love hotdogs and pizza," Jamie said. "Well, I love hamburgers with pickles," Susan replied. "What are we going to eat for lunch today?" Jamie asked. "Anything but liver and spinach!" Susan exclaimed. "I hate spinach!" "So do I," Jamie agreed. "My mom makes me eat something green everyday." "So does mine," Susan said. "I wish I could just eat whatever I want each day, and my mom would just not care!" Susan said. "Me too," Jamie said. "Look, this stand is selling French fries. Let's go over there and get some," Jamie suggested. "O.K." Susan said, "But we need to eat hamburgers with them." "It's a deal!" Jamie exclaimed.

Which of the following would properly describe the passage?

A. The girls think all green food tastes bad.
B. The two friends like and dislike some of the same foods.
C. French fries are a food both girls like.
D. The girls both had French fries and hamburgers for lunch.

In this example, question 18 is a brain question, answer choices A and B are brain answers, answer choices C and D are book answers, and answer choice B is the correct answer. Answer choices A and B are brain answers because they represent generalizations and not specific information from passage 16. Although answer choice A is a generalization, it is not supported by evidence from passage 16. In contrast, answer choice B is a correct generalization supported by evidence from passage 16. Answer choices C and D are book answers because they include specific details from passage 16 and not generalizations of passage 16.

In a particular embodiment, at least one of questions 18 tests a user's ability to make a judgment based on evidence from passage 16. Question 18 is typically a brain question because the user generally will not find specific wording from passage 16 in a correct answer choice. Rather, the user must evaluate evidence from passage 16. Consider the following exemplary passage 16 and question 18:

Many people like to have a pet. When we think of the pets, most of us think of cats or dogs. Cats and dogs are called domestic animals. A domestic animal can be trained, can live with animals, and should not attack the owner. Wild animals, though they can be trained to do certain tricks, tend to attack people—even their trainers. Seeing wild animals in a zoo or circus is a wonderful event. Lions, tigers, and bears are wild animals that can be trained, but they would not make good house pets. Why? Lions, tigers, and bears are natural hunters and fighters. When they get hungry, they will attack for food. Circus and zoo keepers know this, so they make sure to keep these wild animals fed well and often. It is a good thing that cats and dogs usually do not attack when they get hungry. They usually wait patiently for their dinner, and some can eat right out of their owners hands.

What is the best reason for keeping a pet?

A. Cats and dogs are usually "people pets."

B. Lions, tigers, and bears are fin to see, but these animals are dangerous to live with if they get hungry.

C. Even some domestic animals will attack.

D. Domestic pets are tame.

In this example, question 18 is a brain question, answer choices A and B are book answers, answer choices C and D are brain answers, and answer choice D is the correct answer. Answer choices A and B are book answers because they contain specific facts from passage 16 and not a general judgment that may be inferred from passage 16. Answer choice C is an incorrect brain answer because it is a general judgment, which, although based on a common sense, is not responsive to question 18. Answer choice D is the correct answer because it is a general judgment that is supported by passage 16 and is responsive to question 18.

In a particular embodiment, at least one of questions 18 tests a user's ability to predict an outcome from passage 16. Question 18 typically is a brain question because the user must infer the outcome from passage 16. Consider the following exemplary passage 16 and question 18:

A noisy frog was jumping one day. Not many of the animals really liked the frog. He was sarcastic and made rude comments to all the birds. He laughed at the fish when they were caught by a fisherman. The squirrels avoided the frog because he splashed water on them, especially when they wanted to get a drink. One day the frog was doing his usual jumping. He jumped on one lily pad, and then another lily pad, and then another. Finally, the frog jumped.

What will the frog usually do next?

A. The frog will make rude comments.

B. The frog will jump in the water.

C. The fishermen will catch the frog and punish him.

D. The frog will jump on another lily pad.

In this example, question 18 is a brain question, answer choices A and C are book answers, answer choices B and D are brain answers, and answer choice D is correct. Answer choices A and C are book answers because they contain specific information from passage 16. Answer choice B is an outcome that may be suggested by common sense but is not supported by evidence in passage 16. Answer choice D is the correct outcome supported by passage 16.

In a particular embodiment, at least one of questions 18 tests a user's ability to summarize information from passage 16. Question 18 is a brain question because the user cannot identify the correct answer explicitly in passage 16 but rather must infer the correct answer from passage 16. The correct answer to question 18 is a summarization supported by passage 16. Incorrect answer choices to question 18 may include summarizations not supported by passage 16 or detailed information from passage 16 that does not qualify as a summarization. Considering the following exemplary passage 16 and questions 18:

There is an old saying that goes, "One man's junk is another man's treasure." This saying is often true. People everywhere sell or give away items they would consider worthless, but to collectors these same items are priceless. There are some people who make their living by going to garage sales and picking up other people's old junk. Then they turn around and sell the same garage sale items at an auction. Collectors come to try to gather special items for their personal collections. People collect all kinds of things. The most popular collectibles are jewelry, books and antiques. At times what is sold in a garage sale may not be worthless at all. It may be worth millions of dollars.

What is the best summarization of this passage?

A. People may make mistakes by putting a really low price on garage sale items.

B. Common collectibles are jewelry, books and antiques.

C. "One man's junk is another man's treasure."

D. Some people become rich on other people's junk.

In this example, question 18 is brain question, answer choices B and C are book answers, answer choices A and D are brain answers, and answer choice D is correct. Answer choices B and C are book answers because they contain detailed information from passage 16. Neither answer choice B or C qualifies as a summarization. Answer choice A is a brain answer because it is not stated in passage 16 but may be suggested by common sense. Answer choice A, however, is not a summarization supported by passage 16. Answer choice D is a correct brain answer because it is a true summarization supported by evidence from passage 16.

Figure 2A:
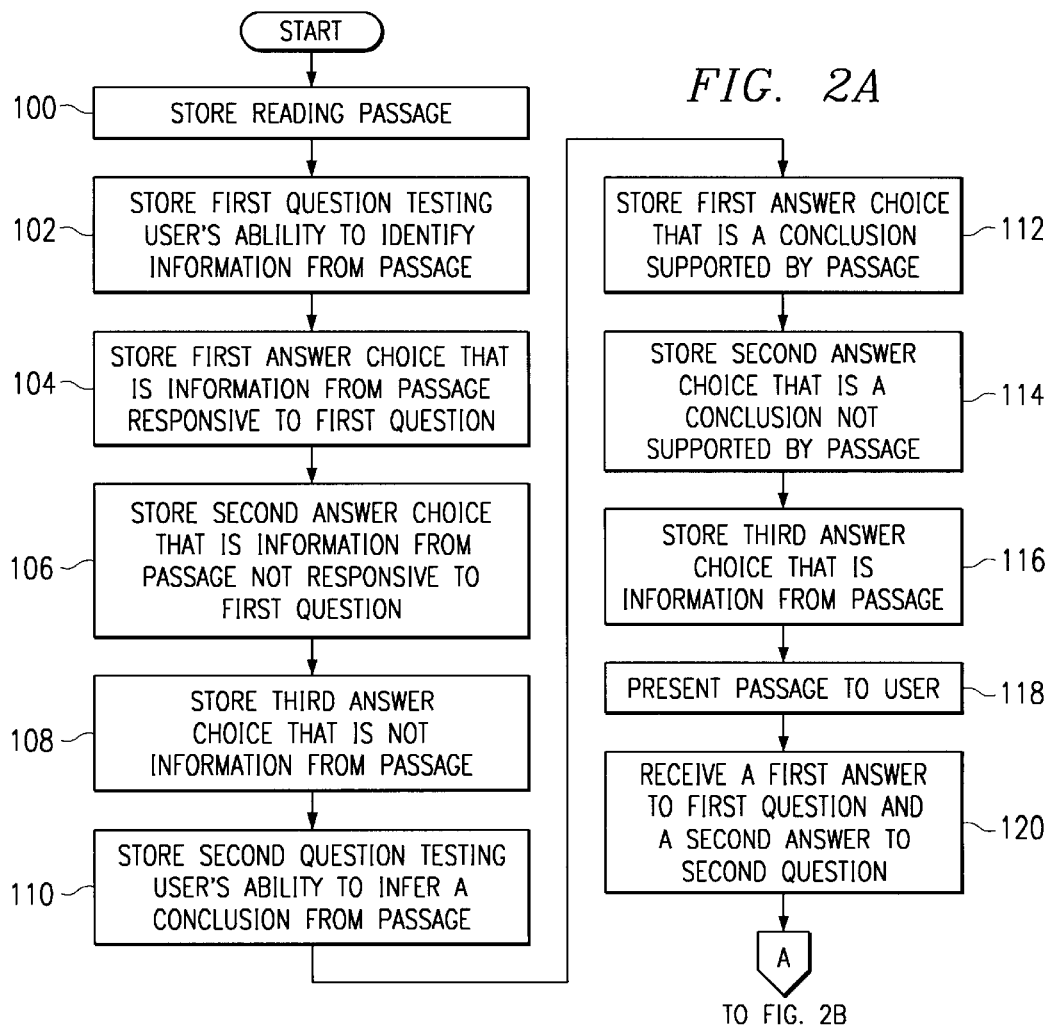
FIGS. 2A and 2B illustrate a flowchart of a method for improving a user's performance on reading tests.
Figure 2B:
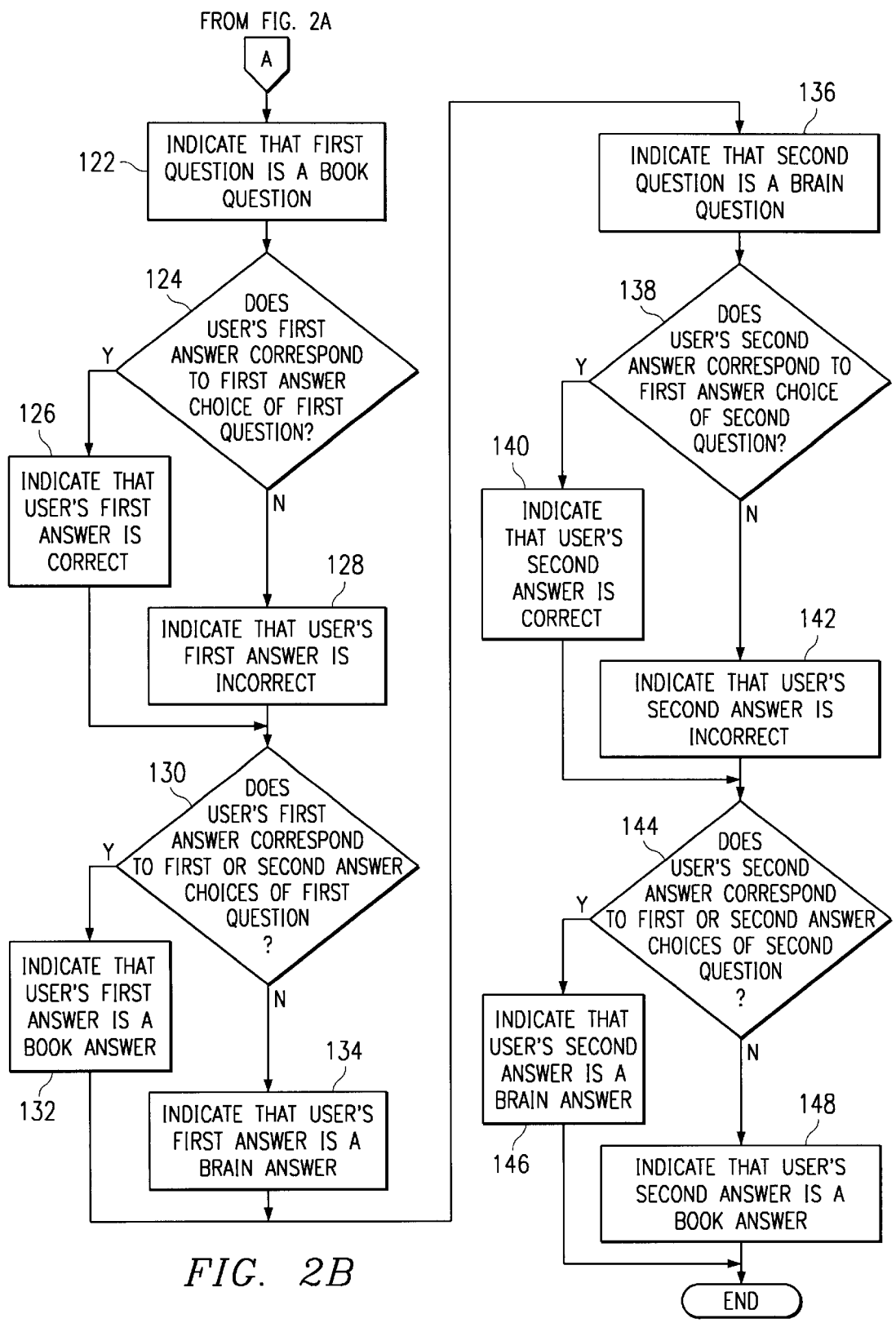

FIG. 2 is a flowchart of a method of improving a user's performance on reading tests. The method begins at step 100, where memory 14 stores reading passage 16. Memory 14 stores a first question 18 testing a user's ability to identify information from passage 16 at step 102. Memory 14 stores a first answer choice that is information from passage 16 responsive to first question 18 at step 104, stores a second answer choice that is information from passage 16 not responsive to first question 18 at step 106, and stores a third answer choice that is not information from passage 16 at step 108. In addition, memory 14 stores a second question 18 testing a user's ability to infer a conclusion from passage 16 at step 110. Memory 14 stores a first answer choice that is a conclusion supported by passage 16 at step 112, stores a second answer choice that is a conclusion not supported by passage 16 at step 114, and stores a third answer choice that is information from passage 16. Test module 22 presents passage 16 to a user at step 118 and receives, from the user, a first answer to first question 18 and a second answer to second question 18 at step 120.

At step 122, review module 24 indicates to the user that first question 18 is a book question. Review module 24 determines whether the user's first answer corresponds to the first answer choice of first question 18 at step 124. If the user's first answer corresponds to the first answer choice, review module 24 indicates to the user that the first answer is correct at step 126. If the user's first answer does not correspond to the first answer choice, review module 24 indicates to the user that the first answer is incorrect at step 128. At step 130, review module 24 determines whether the user's first answer corresponds to the first or second answer choices of first question 18. If the user's first answer corresponds to the first or second answer choices, review module 24 indicates to the user that the first answer is a book answer at step 132. If the user's first answer does not corresponds to the first or second answer choices, review module 24 indicates to the user that the first answer is a brain answer. Review module 24 indicates to the user that second question 18 is a brain question at step 136. Review module 24 determines whether the user's second answer corresponds to the first answer choice of second question 18 at step 138. If the user's second answer corresponds to the first answer choice, review module 24 indicates to the user that the first answer is correct at step 140. If the user's second answer does not correspond to the first answer choice, review module 24 indicates to the user that the second answer is incorrect at step 142. At step 144, review module 24 determines whether the user's second answer corresponds to the first or second answer choices of second question 18. If the users second answer corresponds to the first or second answer choices, review module 24 indicates to the user that the second answer is a brain answer at step 146, and the method ends. If the user's second answer does not correspond to the first or second answer choices, review module 24 indicates to the user that the second answer is a book answer at step 148, and the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A computer system for improving a user's performance on reading tests, comprising:
   a memory operable to store:
      a reading passage;
      a first question testing a user's ability to identify information from the passage, the first question comprising:
         a first answer choice comprising the information from the passage that is responsive to the first question;
         a second answer choice comprising other information from the passage that is not responsive to the first question; and
         a third answer choice comprising other information that is not from the passage;
      a second question testing the user's ability to infer a conclusion from the passage, the second question comprising:
         a fourth answer choice comprising the conclusion that is supported by the passage;
         a fifth answer choice comprising another conclusion that is not supported by the passage; and
         a sixth answer choice comprising information from the passage;
      an answer key indicating that the first question is a book question and that the second question is a brain question, the answer key further indicating that the first, second, and sixth answer choices are book answers and that the third, fourth, and fifth answer choices are brain answers;
   a test module operable to:
      present the reading passage and the first and second questions to the user; and
      receive a first answer to the first question and a second answer to the second question from the user; and a review module operable to:
         indicate to the user that the first question is a book question;
         indicate to the user that the first answer is correct if it corresponds to the first answer choice;
         indicate to the user that the first answer is a book answer if the first answer corresponds to the first or second answer choice;
         indicate to the user that the first answer is a brain answer if the first answer corresponds to the third answer choice;
         indicate to the user that the second question is a brain question;
         indicate to the user that the second answer is correct if it corresponds to the fourth answer choice;
         indicate to the user that the second answer is a brain answer if the second answer corresponds to the fourth or fifth answer choices; and
         indicate to the user that the second answer is a book answer if the second answer corresponds to the sixth answer choice.

2. The computer system of claim 1, wherein the review module is further operable to indicate to the user that the first, second, and sixth answer choices are book answers and that the third, fourth, and fifth answer choices are brain answers.

3. The computer system of claim 1, wherein:
   the first question tests the user's ability to identify a similarity from a comparison in the passage;
   the first answer choice is the similarity from the passage;
   the second answer choice is a difference from the passage; and
   the third answer choice is a similarity that is not from the passage.

4. The computer system of claim 1, wherein:
   the first question tests the user's ability to identify a difference from a contrast in the passage;
   the first answer choice is the difference from the passage;
   the second answer choice is a similarity from the passage; and
   the third answer choice is a difference that is not from the passage.

5. The computer system of claim 1, wherein:
   the first question tests the user's ability to identify a meaning of a word as used in the passage;
   the first answer choice is the meaning of the word in the passage; and
   the third answer choice is a second meaning of the word that does apply to the word as used in the passage.

6. The computer system of claim 1, wherein:
   the first question tests the user's ability to identify a fact from the passage;
   the first answer choice is the fact from the passage;
   the second answer choice is an opinion from the passage; and
   the third answer choice is a second fact that is not from the passage.

7. The computer system of claim 1, wherein:
   the second question tests the user's ability to predict an outcome;
   the fourth answer choice is the outcome supported by the passage;
   the fifth answer choice is an outcome not supported by the passage; and
   the sixth answer choice is specific information from the passage.

8. The computer system of claim 1, wherein:
   the second question tests the user's ability to make a generalization from the passage;
   the fourth answer choice is the generalization supported by the passage;
   the fifth answer choice is a generalization not supported by the passage; and
   the sixth answer choice is specific information from the passage.

9. The computer system of claim 1, wherein:
the second question tests the user's ability to summarize the passage;
the fourth answer choice is a summarization supported by the passage;
the fifth answer choice is a summarization not supported by the passage; and
the sixth answer choice is specific information from the passage.

10. Software embodied in a computer-readable medium and operable to perform the following steps:
presenting a reading passage to a user;
presenting the user a first question that tests the user's ability to identify information from the passage, the first question comprising:
  a first answer choice comprising the information from the passage that is responsive to the first question;
  a second answer choice comprising information from the passage that is not responsive to the first question; and
  a third answer choice comprising information that is not from the passage;
presenting the user a second question that tests the user's ability to infer a conclusion from the passage, the second question comprising:
  a fourth answer choice comprising the conclusion that is supported by the passage;
  a fifth answer choice comprising a conclusion that is not supported by the passage; and
  a sixth answer choice comprising information from the passage;
receiving a first answer to the first question and a second answer to the second question from the user;
indicating to the user that the first question is a book question;
indicating to the user that the first answer is correct if it corresponds to the first answer choice;
indicating to the user that the first answer is a book answer if the first answer corresponds to the first or second answer choices;
indicating to the user that the first answer is a brain answer if the first answer corresponds to the third answer choice;
indicating to the user that the second question is a brain question;
indicating to the user that the second answer is correct if it corresponds to the first answer choice;
indicating to the user that the second answer is a brain answer if the second answer corresponds to the first or second answer choices; and
indicating to the user that the second answer is a book answer if the second answer corresponds to the third answer choice.

11. The software of claim 10, further operable to perform the step of indicating to the user that the first, second, and sixth answer choices are book answers and the third, fourth, and fifth answer choices are brain answers.

12. The software of claim 10, wherein:
the first question tests the user's ability to identify a similarity from a comparison in the passage;
the first answer choice is the similarity from the passage;
the second answer choice is a difference from the passage; and
the third answer choice is a similarity that is not from the passage.

13. The software of claim 10, wherein:
the first question tests the user's ability to identify a difference from a contrast in the passage;
the first answer choice is the difference from the passage;
the second answer choice is a similarity from the passage; and
the third answer choice is a difference that is not from the passage.

14. The software of claim 10, wherein:
the first question tests the user's ability to identify a meaning of a word as used in the passage;
the first answer choice is the meaning of the word in the passage; and
the third answer choice is a second meaning of the word that does apply to the word as used in the passage.

15. The software of claim 10, wherein:
the first question tests the user's ability to identify a fact from the passage;
the first answer choice is the fact from the passage;
the second answer choice is an opinion from the passage; and
the third answer choice is a second fact that is not from the passage.

16. The software of claim 10, wherein:
the second question tests the user's ability to predict an outcome;
the fourth answer choice is the outcome supported by the passage;
the fifth answer choice is an outcome not supported by the passage; and
the sixth answer choice is specific information from the passage.

17. The software of claim 10, wherein:
the second question tests the user's ability to make a generalization from the passage;
the fourth answer choice is the generalization supported by the passage;
the fifth answer choice is a generalization not supported by the passage; and
the sixth answer choice is specific information from the passage.

18. The software of claim 10, wherein:
the second question tests the user's ability to summarize the passage;
the fourth answer choice is a summarization supported by the passage;
the fifth answer choice is a summarization not supported by the passage; and
the sixth answer choice is specific information from the passage.

19. A method of teaching reading comprehension, comprising:
presenting a reading passage to a user;
asking the user a question relating to the reading passage;
receiving an answer from the user;
indicating to the user that the answer is an incorrect type of answer to the question if the question tests the user's ability to identify information from the passage and the answer comprises information that is not from the passage; and
indicating to the user that the answer is an incorrect type of answer to the question if the question tests the user's ability to infer a conclusion from the passage and the answer comprises specific information from the passage.

20. The method of claim 19, further comprising:

indicating to the user that the question is a book question if the question tests the user's ability to identify information from the passage;

indicating to the user that the question is a brain question if the question tests the user's ability to infer a conclusion from the passage;

indicating to the user that the answer is a book answer if the answer comprises information from the passage; and indicating to the user that the answer is a brain answer if the answer comprises information that is not from the passage.

21. Written material for improving a user's performance on reading tests, comprising:

a reading passage;

a first question testing a user's ability to identify information from the passage, the first question comprising:

a first answer choice comprising the information from the passage that is responsive to the first question;

a second answer choice comprising other information from the passage that is not responsive to the first question; and a third answer choice comprising other information that is not from the passage;

a second question testing the user's ability to infer a conclusion from the passage, the second question comprising:

a fourth answer choice comprising the conclusion that is supported by the passage;

a fifth answer choice comprising another conclusion that is not supported by the passage; and a sixth answer choice comprising information from the passage; and an answer key readable by the user after the user has selected a particular answer choice for at least one question, the answer key indicating that the first question is a book question and that the second question is a brain question, the answer key further indicating that the first, second, and sixth answer choices are book answers and that the third, fourth, and fifth answer choices are brain answers.

* * * * *